United States Patent
Kawamae et al.

(10) Patent No.: US 6,778,757 B1
(45) Date of Patent: Aug. 17, 2004

(54) DATA RECORDING/REPRODUCTION APPARATUS AND METHOD

(75) Inventors: Osamu Kawamae, Yokohama (JP); Toshifumi Takeuchi, Tokyo (JP); Takao Arai, Yokohama (JP); Hiroyuki Kimura, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,944

(22) Filed: Oct. 21, 1999

(30) Foreign Application Priority Data

Oct. 23, 1998 (JP) .......................................... 10-301989

(51) Int. Cl.[7] .............................. H04N 5/91; H04N 7/26; H04N 7/08
(52) U.S. Cl. .............................. 386/94; 386/109; 386/95
(58) Field of Search ................................ 386/46, 94, 1, 386/52, 95, 109, 111, 112, 27, 33; 360/4, 15, 57; 380/201, 203; 713/176, 164; H04N 5/31, 7/26, 7/08

(56) References Cited

U.S. PATENT DOCUMENTS 5,627,655 A * 5/1997 Okamoto et al.
6,314,518 B1 * 11/2001 Linnartz

OTHER PUBLICATIONS

"Nikkei Electronics" pp. 31–32, May 18,1998.*
"Nikkei Electronics", pp. 47–53, Mar. 23, 1998.*

* cited by examiner

*Primary Examiner*—Robert Chevalier
(74) *Attorney, Agent, or Firm*—Antonelli, Terry, Stout & Kraus, LLP

(57) ABSTRACT

A data recording/reproduction apparatus and method are disclosed, in which a recording medium for digitally recording and reproducing a copyrighted signal is prevented from being illegally duplicated and controlled by a duplication control method conforming with the signal input and the internal functions of the apparatus. An image signal is compressed, the compressed data is converted by a first converter into a format adapted for recording in a recording medium, and the data is recorded by a recording unit in the recording medium. The data recording/reproduction apparatus further comprises a first detection unit for detecting the duplication limiting information embedded in the image signal. Further, the input/output of the image information can be suspended in accordance with the duplication limiting information.

5 Claims, 13 Drawing Sheets

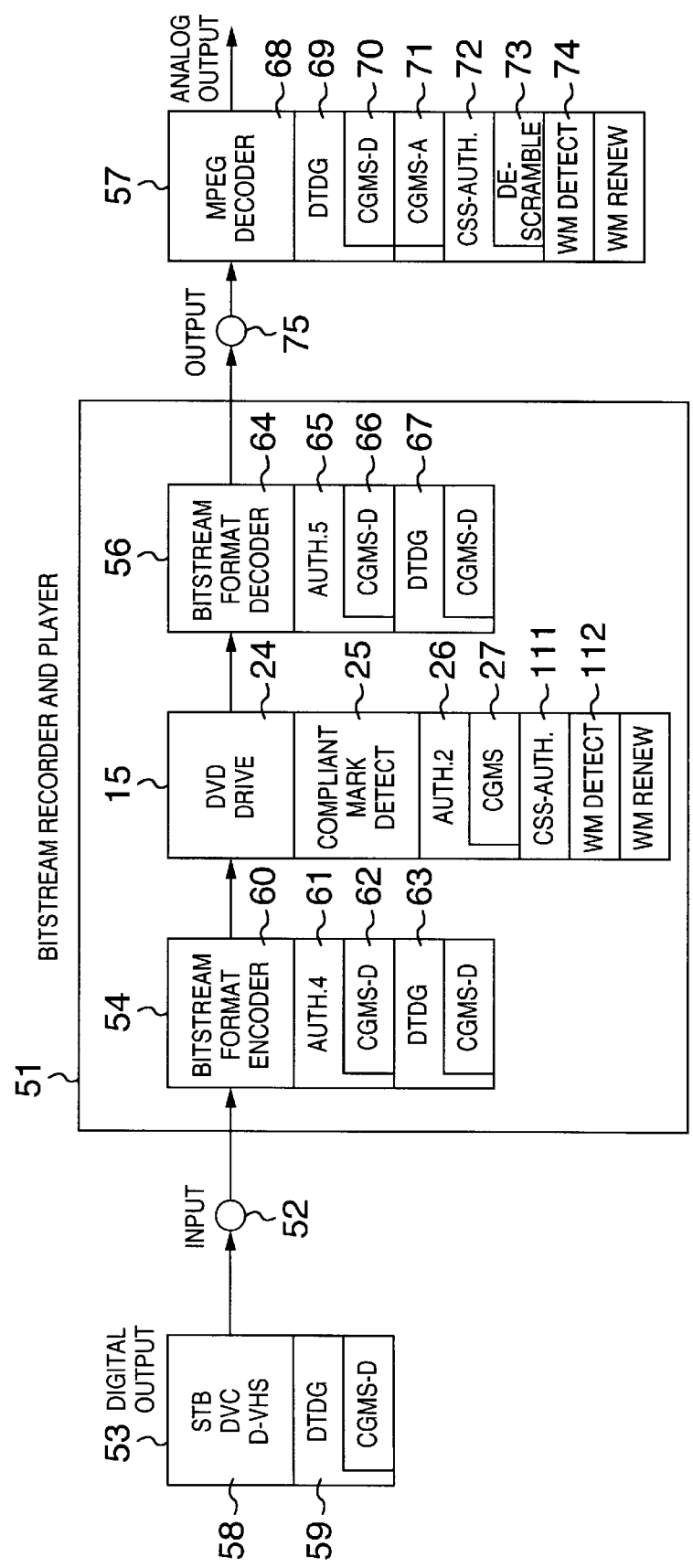

DATA RECORDING/REPRODUCTION APPARATUS AND METHOD

CROSS-REFERENCE TO RELATED APPLICATIONS

The present application relates to subject matters described in co-pending applications Ser. No. 09/289,974, filed on Apr. 13, 1999 and Ser. No. 09/208,443, filed on Dec. 10, 1998.

BACKGROUND OF THE INVENTION

The present invention relates to a recording/reproduction or a reproduction or a recording apparatus for recording and/or reproducing images and audio data or controlling the reproduction or recording, or more in particular to a recording/reproduction or a recording or a reproduction apparatus for controlling the recording/reproduction or reproduction or recording of a recording medium by duplication management information.

The DVD-ROM is a recording medium having a capacity about seven times as large as the CD-ROM. The DVD-ROM can record even movie software as well as the program code for personal computers (PC) by compressing video and audio data. The recording media for recording data on DVD include DVD-RAM, DVD-R and DVD-RW. A large amount of data can be recorded in these media, and therefore it is necessary to prevent the illegal digital duplication of the movie software or the like as such. Therefore, the technique for preventing the illegal duplication plays an important role for this purpose.

Such techniques include an electronic watermark, the standardization of which is described in "Nikkei Electronics", pp.31–32, May 18, 1998, published by Nikkei BP Co., Ltd.

Apart from the electronic watermark technique, the technique for preventing the illegal duplication in data exchange between equipment using IEEE1394 is also described in the Mar. 23, 1998 issue of "Nikkei Electronics", pp.47–53, published by Nikkei BP.

With the devices such as the DVD-RAM drive which includes digital/analog input/output means, however, it is difficult to prevent illegal duplication with these techniques alone. Such techniques are even sometimes easily avoided. Also, data exchange within the personal computer is more complicated, often generating a loophole of duplication control.

In view of this, it is necessary to configure a system using an appropriate combination of a plurality of duplication control techniques including the watermark technique and the IEEE1394 antiduplication technique

SUMMARY OF THE INVENTION

In order to achieve the object mentioned above, according to a first aspect of the present invention, there is provided a data recording apparatus comprising means for compressing an image signal, first conversion means for converting the compressed data into a format for recording in a recording medium, and means for recording the data in the recording medium,
wherein the compression means includes first detection means for detecting the added information embedded in the image signal.

According to a second aspect of the invention, there is provided a data reproduction apparatus comprising means for reproducing data from a recording medium, second conversion means for converting the reproduced data from the format recorded in the recording medium to the format for demodulating the image signal, and means for expanding the data converted in the second conversion means in accordance with a method by which the data are compressed;
wherein the expansion means includes second detection means for detecting the added information embedded in the image signal.

According to a third aspect of the invention, there is provided a data recording/reproduction apparatus, wherein the expansion means includes rewrite means for rewriting the added information, and the reproduction means includes third detection means for detecting a signal for determining whether the recording means recorded in the recording medium is a formal one or not, each means of the apparatus including authentication means for mutual authentication among the means.

According to a fourth aspect of the invention, there is provided a baseband recording/reproduction apparatus and a bit stream recording/reproduction apparatus in which a MPEG encoder/decoder, a bit stream encoder/decoder, recording means and reproduction means each have an appropriate duplication control means thereby to prevent the copyrighted data from being illegally recorded or reproduced.

According to a fifth aspect of the invention, there is provided a similar recording/reproduction apparatus comprising a MPEG encoder/decoder including watermark detection means and renew means for detecting and updating the watermark from the baseband data.

According to a sixth aspect of the invention, there is provided a similar apparatus, wherein the recording means or the reproduction means includes watermark detection means and watermark renewing means, whereby the watermark in the signal recorded in the disk or reproduced from the disk can be detected and renewed, thereby making it more difficult to avoid the detection and updating than with the MPEG encoder/decoder.

Further, even in the case where the recording medium is replaced with another type, the method for detecting/updating the watermark remains the same.

BRIEF DESCRIPTION OF THE DRAWINGS

FIG. 16 is a diagram showing a recording/reproduction apparatus for recording/reproducing data containing the duplication control information according to still another embodiment of the invention.

DESCRIPTION OF THE EMBODIMENTS

An embodiment of the invention will be explained below with reference to the drawings.

Figure 1:
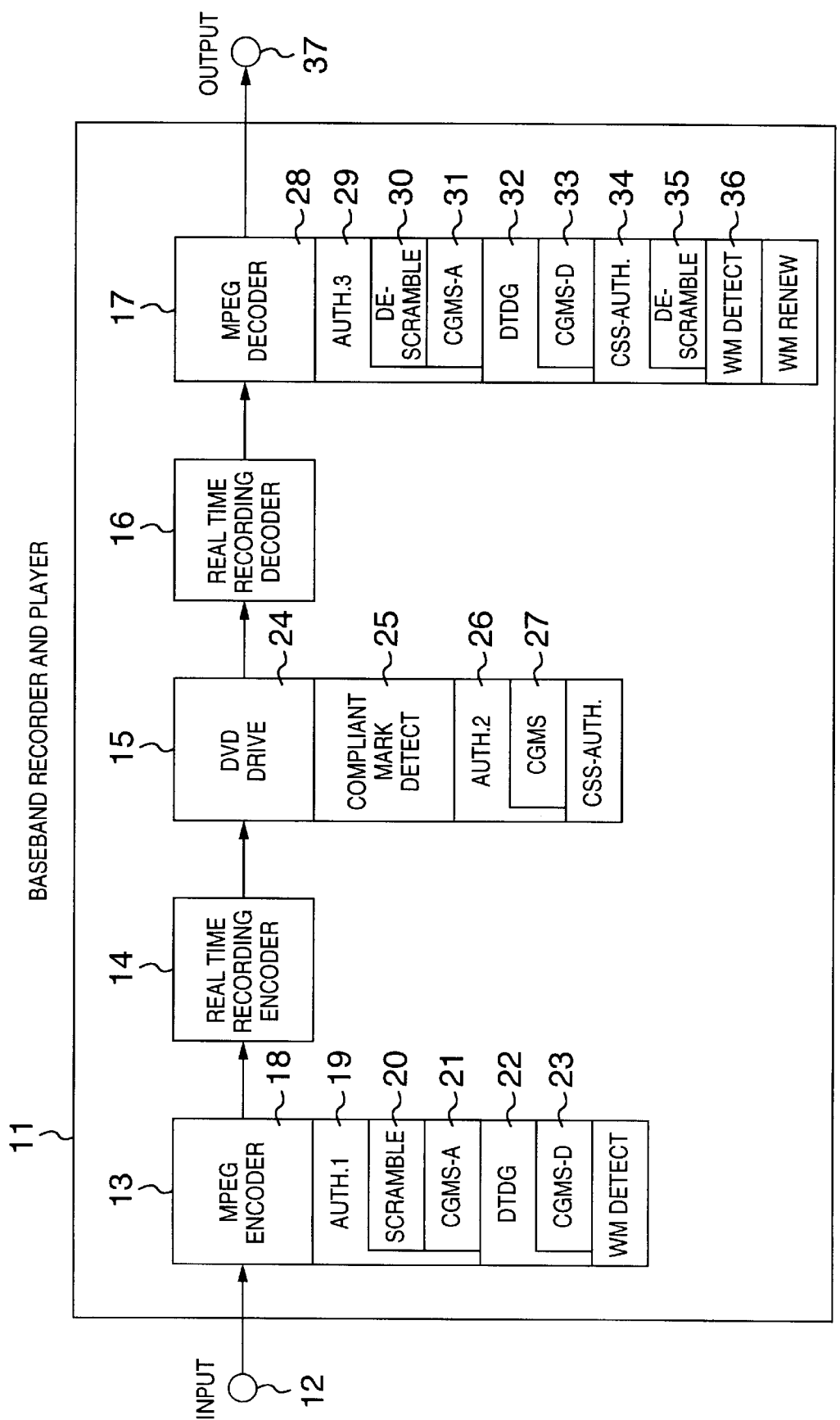
FIG. 1 is a diagram showing a recording/reproduction apparatus for recording and reproducing data including duplication control information according to an embodiment of the invention.

FIG. 1 shows a recording/reproduction apparatus for recording and reproducing (playing) data containing duplication control information according to an embodiment of the present invention. This embodiment represents a recording/reproduction apparatus such as a DVD-RAM drive, for example. The present invention, however, is not of course limited to the recording/reproduction apparatus but a recording apparatus and a reproduction apparatus are incorporated as a part of the present embodiment.

In FIG. 1, reference numeral 11 designates a baseband recording/reproduction apparatus (baseband recorder and player), numeral 12 a signal input unit, numeral 13 a MPEG encoder, numeral 14 a real time encoder (also called compression unit), numeral 15 a DVD-RAM drive, numeral 16 a real-time decoder (also called expansion unit), numeral 17 a MPEG decoder, numeral 18 an authentication unit #1 for the MEPG recorder, numeral 19 scramble unit for the MPEG encoder, numeral 20 a CGMS-A of the authentication unit #1, numeral 21 a DTDG unit for controlling the duplication in accordance with the method employed in the DTDG (digital transmission discussion group) of the MPEG encoder, numeral 22 a CGMS-D of the DTDG, numeral 23 a watermark detection unit for the MPEG encoder, numeral 24 compliant mark detection unit for the DVD-RAM drive, numeral 25 an authentication unit #2 for the DVD-RAM drive, numeral 26 a CGMS for the authentication unit #2, numeral 27 a CSS (content scramble system) authentication unit #3 for the DVD-RAM drive, numeral 28 an authentication unit #3 for the MPEG decoder, numeral 29 a descramble unit for the MPEG decoder, numeral 30 a CGMS-A for the authentication unit #3, numeral 31 a DTDG unit for the MPEG decoder, numeral 32 a CGMS-D for the DTDG, numeral 33 a CSS authentication unit for the MPEG decoder, numeral 34 a CSS descramble unit, numeral 35 a watermark detection unit for the MPEG decoder, numeral 36 a watermark renewing unit for the MPEG decoder, and numeral 37 a signal output.

The operation of this system will be explained with reference to FIG. 1.

This embodiment represents an apparatus for recording/reproducing data in a medium capable of recording and reproduction such as a DVD-RAM, but is not of course limited to an optical disk as a recording medium but applicable to the recording/reproduction apparatuses in general for recording and reproducing data.

A signal to be recorded such as the one received by a receiver including a set top box for receiving a satellite broadcast program is input as a signal input 12 to the baseband recording/reproduction apparatus 11. The baseband recording/reproduction apparatus 11 compresses the image sequence data, for example, by a MPEG format, thereby recording/reproducing it in a recording medium such as a DVD-RAM disk. For this purpose, the baseband recording/reproduction apparatus 11 generally comprises a MPEG encoder 13, a real-time encoder 14, a DVD-RAM drive 15, a real-time decoder 16 and a MPEG decoder 17. Consider a personal computer having a similar function. Each component element can be replaced as a part such as an expansion board or software, and thus can be regarded as an independent entity. Considering the case where the component elements are replaceable as described above, the explanation below is based on the assumed case of the personal computer.

The MPEG encoder 13 converts the input signal into a MPEG format. The MPEG encoder 13 includes an authentication unit #1 (18), a DTDG unit 21 and a watermark detection unit 21. The authentication unit #1 (18) authenticates the devices for generating an input signal and the DVE-RAM drive. In the case where the authentication fails, the output of the encoded data is suspended or the acceptance of the input signal is rejected. The authentication unit #1 (18) also includes scramble unit 19 for preventing the data in the recording disk from being read as such, and a CGMS-A (20) for updating the duplication generation management information as an analog signal by recording the input signal. The scramble unit 19 prevents any data on the bus from being read as such even when fetched by any device before being sent to the DVD-RAM drive. Further, the DTDG unit 21 for controlling the duplication in digital transmission by IEEE1394 includes a CGMS-D22 for updating the duplication generation management information as a digital signal after being duplicated in a digital transmission signal. The watermark detection unit 21 detects the watermark (also called the added information) embedded in the baseband data.

The real-time encoder 14 converts the scrambled MPEG-encoded signal into a format for writing the scrambled MPEG-encoded signal into the DVD-RAM disk.

The DVD-RAM drive 15 includes a compliance mark detection unit 24, an authentication unit #2 (25) and a CSS authentication unit 27. The authentication unit #2 (25) authenticates the input and output devices, i.e. the MPEG encoder at the time of recording and the MPEG decoder at the time of reproduction. The CGS 26 records the duplication generation management information on the disk. The compliant mark detection unit 24 records the compliant mark for indicating that the DVD-RAM drive is a compliant device at the time of recording. At the time of reproduction, on the other hand, the compliant mark detection unit 24 detects a compliant mark which is recorded if the device that has recorded the data in the disk is compliant. In the case where such a mark cannot be detected, the reproduction operation is not performed.

With this configuration, the signal recorded in the DVD-RAM disk is generated and transmitted. In this way, the signal transmission to and receipt from the devices that cannot be authenticated is stopped, thereby making it possible to prevent illegal duplication. Also, the provision of the watermark detection unit 21 in the MPEG encoder 13 permits the watermark detection in the baseband data and thus makes the detection easier than with the DVD-RAM drive.

Also, the real-time decoder 16 converts the signal written in the DVD-RAM disk into the MPEG format in real time.

The MPEG decoder 17 includes the authentication unit #3 (28), the DTDG unit 31, the CSS authentication unit 33, the watermark detection unit 35 and the watermark renewing unit 36. The authentication unit #3 (28) authenticates the DVD-RAM drive and the device receiving the output signal, and in the case of authentication failure, suspends the output of the decoded data or rejects the acceptance of an input signal. The authentication unit #3 (28), on the other hand, includes a descramble unit 29 for canceling the scramble which has prevented the data in the disk from being read as such, and a CGMS-A (30) for updating the duplication generation management information with the output signal added to the disk as an analog signal. The data recorded in the disk, which is scrambled so as not to be read as such if fetched on the bus by some device, is descrambled by the descramble means 29. Further, the DTDG unit 31 for controlling the duplication in the digital transmission by IEEE 1394 includes a CGMS-D (32) for updating, as a digital signal, the duplication generation information from the CGMS recorded in the disk. In the case where the disk set in the DVD-RAM drive is a recordable medium, the CSS authentication means 33 authenticates the data according to the CSS. In accordance with the authentication result, the scrambled data are descrambled by the descramble unit 34. The watermark detection unit 35 detects the watermark embedded in the data of the output baseband at the time of reproduction. In the case where the watermark prohibits the reproduction, the output is stopped. The watermark renewing unit 36 embeds the watermark in the output baseband data at the time of reproduction.

The signal recorded in the DVD-RAM disk is reproduced and transmitted with the configuration described above. In this way, it becomes possible to stop the exchange of the signals with the devices that cannot be authenticated thereby to prevent the illegal duplication. In the case of the personal computer, the MPEG encoder 13, the real-time encoder 14, the DVD-RAM drive 15, the real-time decoder 16 and the MPEG decoder 17 is configured of hardware or software and are each replaceable independently. In view of the fact that the signals are not transmitted or received unless the other end of signal transmission is a formal device authenticated, however, the illegal duplication can be prevented. Also, the provision of the watermark detection unit 35 and the watermark renewing unit 36 in the MPEG decoder 17 makes it possible to detect and renew the watermark in the output baseband data, and thereby simplifies the circuit configuration more than when the DVD-RAM drive is used. This embodiment has been described on the assumption that each component element is replaceable independently. For a device in which each component part cannot be replaced independently such as a home-use DVD recording/reproduction apparatus, however, only one authentication unit is required but not a plurality of them are not required for the input/output operation of the particular device.

A plurality of types of duplication control signal detection/renewing unit provided as described above makes it possible to prevent illegal duplication and assures the correct control of the recording and reproduction operation. In FIG. 1, the recording unit is separated from the reproduction unit, and the compression unit from the expansion unit. As an alternative, these units may be provided in such a combination as to make recording/reproduction unit and compression/expansion unit.

Figure 2:
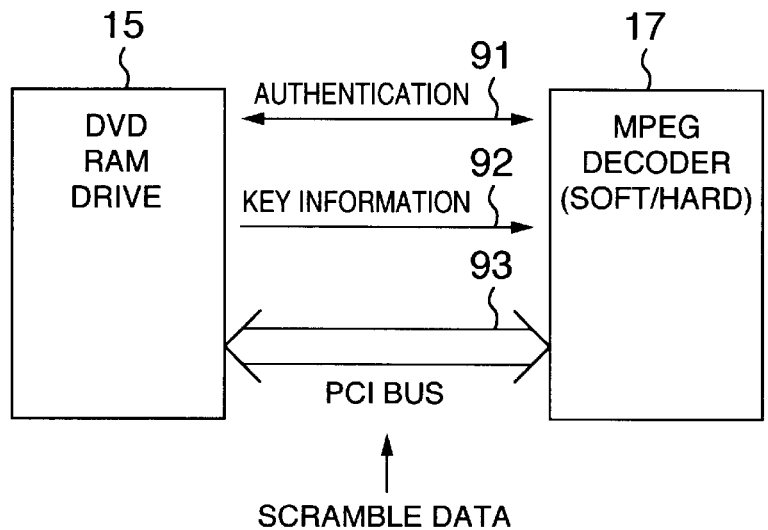
FIG. 2 is a diagram showing an example of the authentication method according to the invention.

FIG. 2 shows an example of authentication and data exchange taking the DVD-RAM drive 15 and the MPEG decoder 17 as an example.

When the reproduction operation is started with the disk mounted on the DVD-RAM drive 15, the first step is to authenticate the MPEG decoder 17. In the case where the authentication 91 is acknowledged between the two devices, the key information for decrypting the data is sent from the DVD-RAM drive 15 to the MPEG decoder 17. The data on the PCI bus 93 is scrambled by encryption so that the data cannot be read as such. The data cannot be reproduced, therefore, unless the key information is received and the password deciphered correctly. By following this procedure, the scrambled data can be safely exchanged. This embodiment, which represents the reproduction procedure, is equally applicable to the recording operation.

Figure 3:
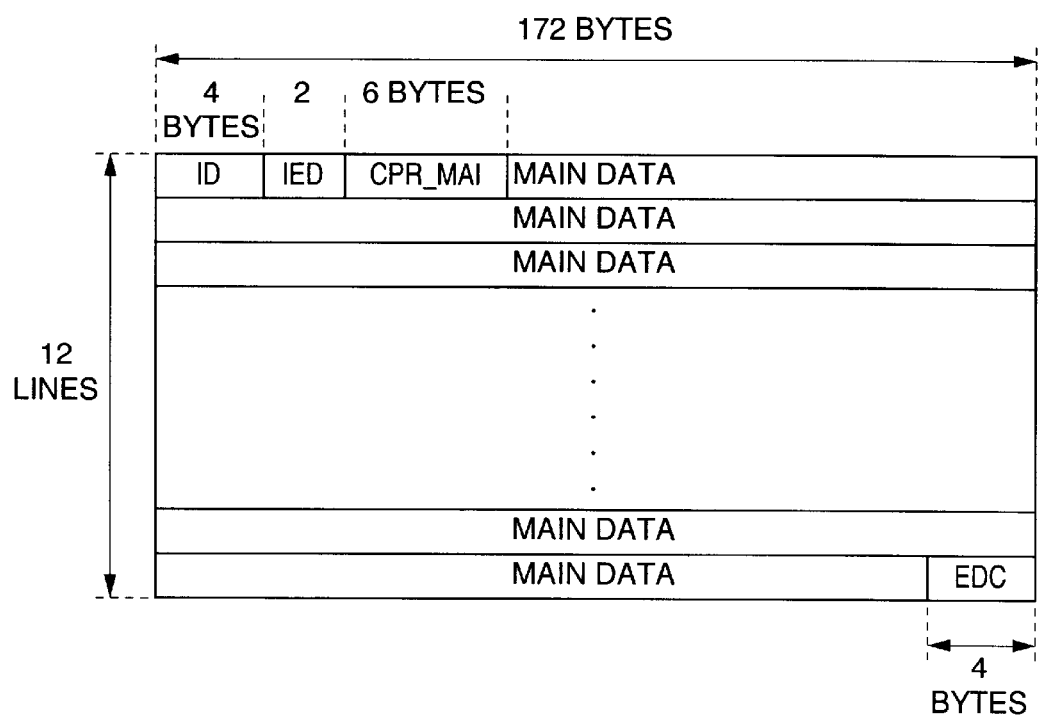
FIG. 3 is a diagram showing a configuration of the DVD sector data as an example of data including the type of the recording medium and the code having recorded therein a data scramble structure according to the invention.

FIG. 3 shows a configuration of the DVD sector data as an example of the data containing the code having recorded therein the types of the recording medium and the scramble structure of the data according to the invention. The DVD has written therein the identification data called ID and the copyright management information called CPR_MAI before the main data of 2,048 bytes.

The copyright management information (CPR_MAI) corresponds to both the copyright management information and the area management information. In the lead-in area, information is described as to whether a specific data structure (corresponding to the scramble structure) of the copyright protection system is to be held or not in the lead-in area and whether the data can be reproduced in a designated area or not. In the data area, information is described as to whether the particular sector contains a material having a copyright or not, whether it has a specific data structure of a copyright protection system and whether the duplication restricting information (permission of duplication, duplication possible by one generation, duplication prohibited) is contained or not.

Figure 4:
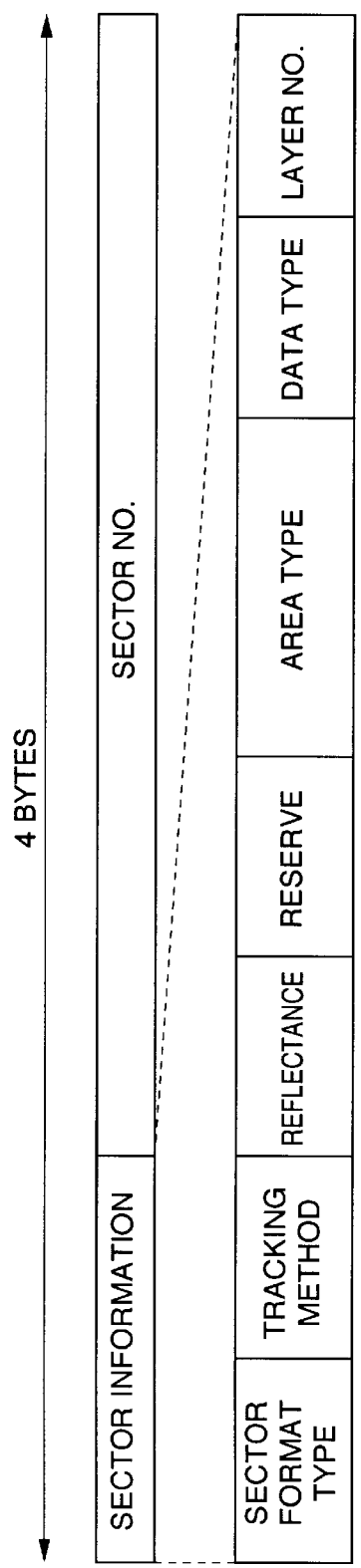
FIG. 4 is a diagram showing a structure of the ID data of the DVD.

FIG. 4 shows the structure of the identification (ID) data of the DVD.

The ID contains, in its first four bytes constituting sector information, a code indicating a reservation for the read-only data called the data type, the write-once data and the rewrite data.

The sector format type is a field having recorded therein the CLV format type specified in the read-only disk and the write-once disk, or the zone format type specified for the rewrite disk. The area type field has recorded therein as to whether it is a data area, a lead-in area, a lead-out area or a middle area of the read-only disk. The data type is considered a reservation for the read-only data or the write-once data (link data) and the rewrite data.

Figure 5:
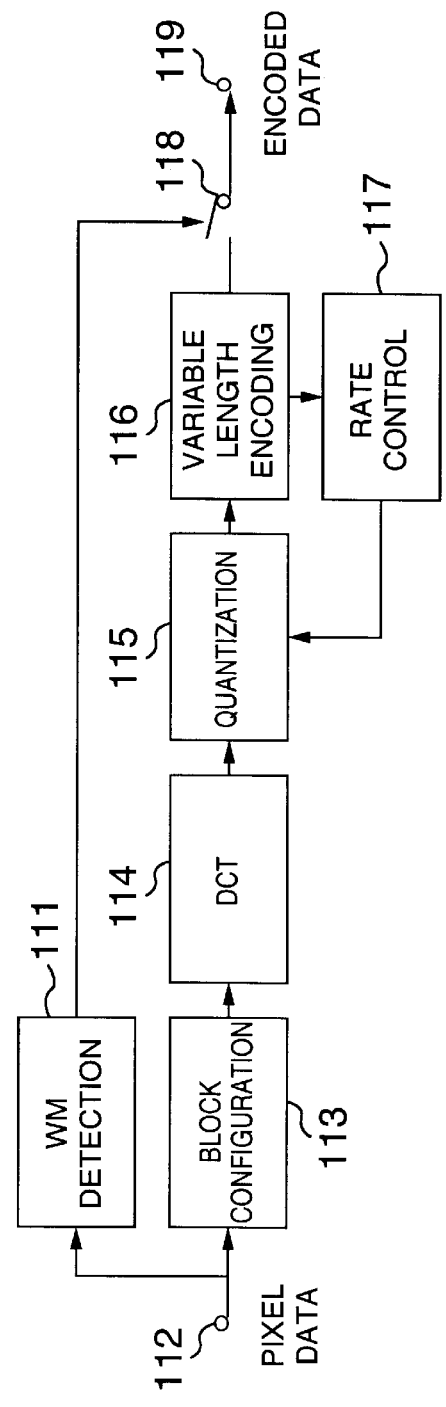
FIG. 5 is a diagram of a MPEG encoder including a watermark detection means according to an embodiment of the invention.

FIG. 5 shows an example of a method of signal processing for the MPEG encoder 13 and the WM detection signal 23 included therein. The authentication and DTDG processing is not shown in the drawings.

Numeral 112 designates a pixel data input terminal, and processing blocks include a WM detection 111, a block configuration 113, a DCT 114, a quantization 115, a variable-length coding 116, a rate control 117, an output control 118, and a coded data output terminal 119. In the case where an image signal is compressed by MPEG with the digitized pixel data as an input for each pixel, the following process is generally performed. In the MPEG compression, the pixels are processed in blocks of several pixels and therefore configured of blocks. After being subjected to DCT (discrete cosine transform), the pixel data are quantized and encoded to a code length correspondig to the data. The coded data are output at a rate controlled not to exceed a predetermined data amount and controlled in the quantization stage. The WM detection unit 111 detects the watermark in the case where the embedded information can be detected ROM the pixel data. In the case where the detected watermark information prohibits the reproduction or the recording in the DVD-RAM drive, the output control unit 118 is switched to suspend the output. The provision of the WM detection unit in the MPEG encoder as described above facilitates the processing of the pixel data.

Assume that the pixel data are displaced during the transmission, e.g. the pixel data are shifted by several lines in the four directions at the time of recording. The watermark position is also displaced, and therefore the watermark is detected to the position where it is originally embedded.

Figure 6:
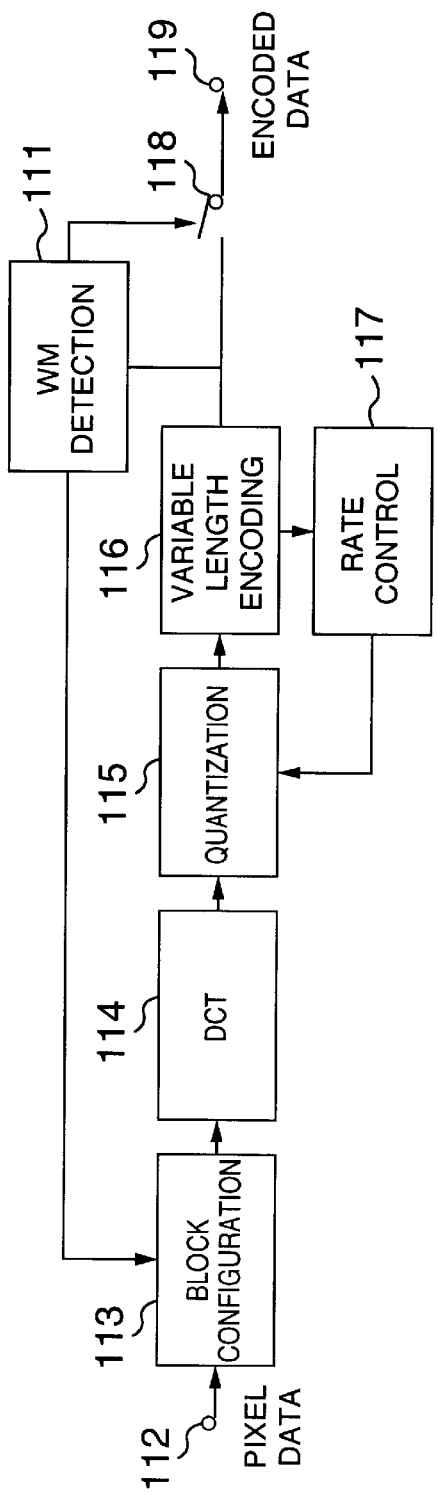
FIG. 6 is a diagram of a MPEG encoder including a watermark detection means according to another embodiment of the invention.

FIG. 6 shows another example of a method for processing the signals for the MPEG encoder 13 and the WM detection unit 23 included therein. The same reference numerals as in FIG. 5 designate the same processing steps, respectively. In the case where the embedded information can be detected from the encoded data, the WM detection unit 111 detects the watermark. In the case where the detected watermark information prohibits reproduction or the recording in the DVD-RAM drive, the output control unit 118 is switched and the output is suspended.

Suppose that the pixel data are displaced during the transmission, e.g. they are shifted by several lines in the four directions at the time of recording. The block configuration is displaced from the position at the original time when the watermark is embedded. Then, the block configuration unit 113 restructures the blocks to the original position of the watermark. Thus the watermark detection is made possible.

Figure 7:
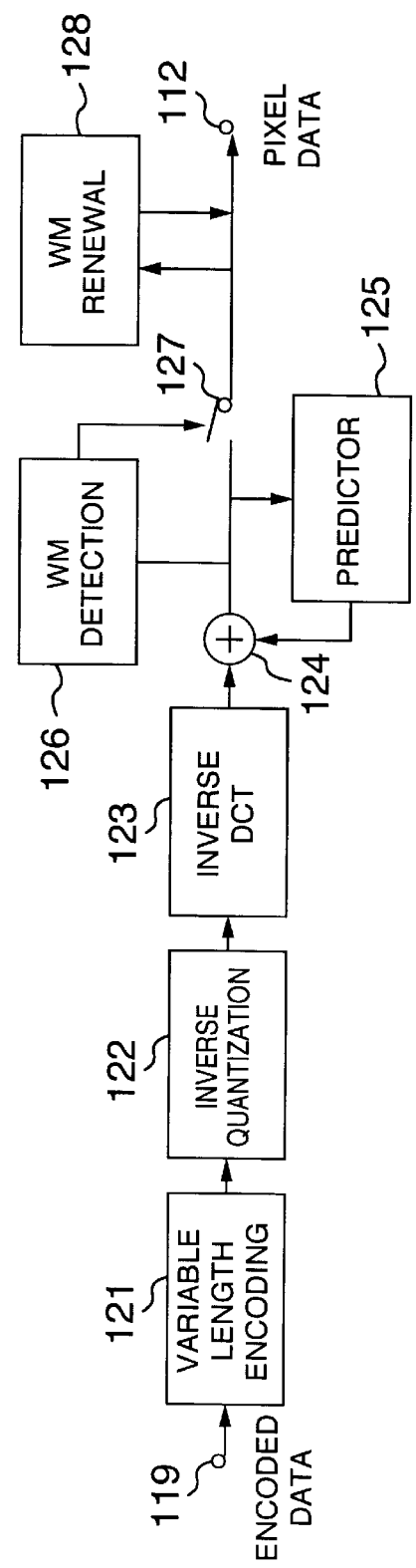
FIG. 7 is a diagram of a MPEG encoder including a watermark detection means according to still another embodiment of the invention.

FIG. 7 shows the MPEG decoder 17 and an example of the signal processing by the WM detection unit 35 and the WM renewing unit 36 included in the MPEG decoder 17. The process of the authentication, DTDG and CSS are not shown.

Numeral 119 designates a coded data, and the specific processes and unit in the blocks include the variable length decoding 121, inverse quantization 122, inverse DCT 123, adder 124, predictor 125, WM detection 126, output control 127, WM updating 128 and pixel data 112. When demodulating the data compressed by MPEG, the following process is performed generally. In the MPEG demodulation, the coded data of different code lengths are decoded, inversely quantized, subjected to inverse DCT and thus restored to the pixel data. In the process, the predictor 125 determines the prediction mode and detects the motion vector, and the adder 124 adds them. In the case where the WM detection unit 126 can detect the embedded information from the pixel data, the watermark is detected. In the case where the detected watermark information prohibits the reproduction or the recording in the DVD-RAM drive, the output control 127 is switched thereby to suspend the output. When outputting the data, the watermark is renewed, if required, in accordance with the duplication control information. The provision of the WM detection and the WM renewing processing in the MPEG decoder in this way facilitates the processing of the pixel data.

Assume that the pixel data are displaced, e.g. they are shifted in the four directions by several lines at the time of recording during the transmission. The watermark is also displaced, and therefore the watermark is required to be detected to the original position of embedding thereof.

Figure 8:
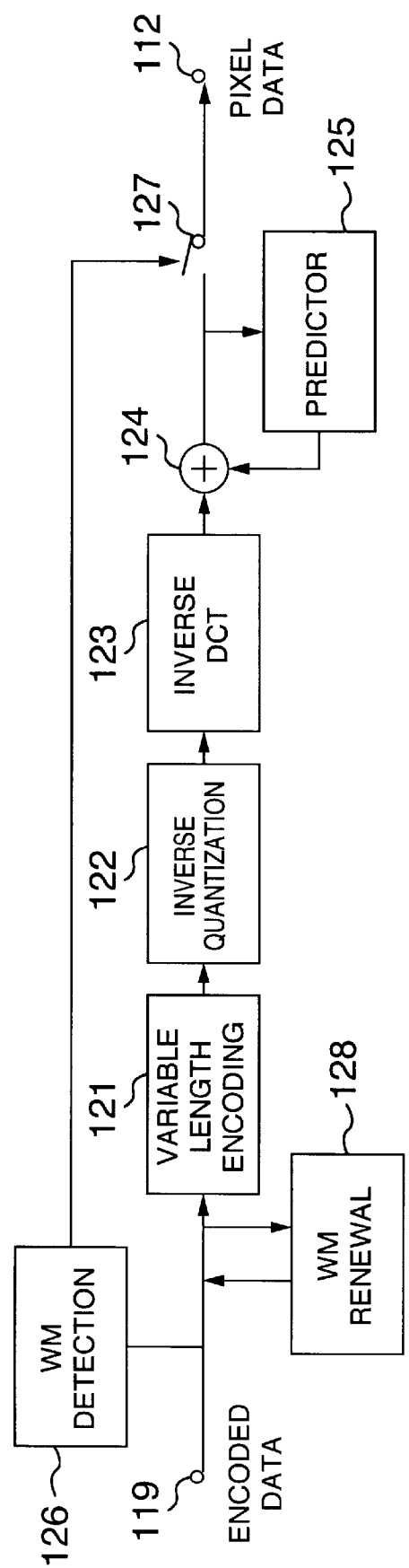
FIG. 8 is a diagram of a MPEG encoder including a watermark detection means according to yet another embodiment of the invention.

FIG. 8 shows the MPEG decoder 17 and another example method of signal processing in the WM detection unit 35 included in the MPEG decoder 17. The same reference numerals as in FIG. 7 designate the same processing, respectively. The WM detection unit 126 detects the watermark in the case where the embedded information can be detected from the encoded data. In the case where the detected watermark information prohibits the reproduction or the recording in the DVD-RAM drive, the output control 127 is switched to suspend the output.

Suppose that the pixel data are displaced during transmission and are shifted by several lines in the four directions at the time of recording. The block configuration is displaced from the original position of embedding the watermark, and therefore, the restructuring of the blocks is required. Thus the blocks are restructured to the position where the watermark is originally embedded, followed by detection of the watermark. It is then determined that the position at which the watermark is detected is where the watermark is embedded. This position is stored thereby to permit subsequent watermark detection.

Figure 9:
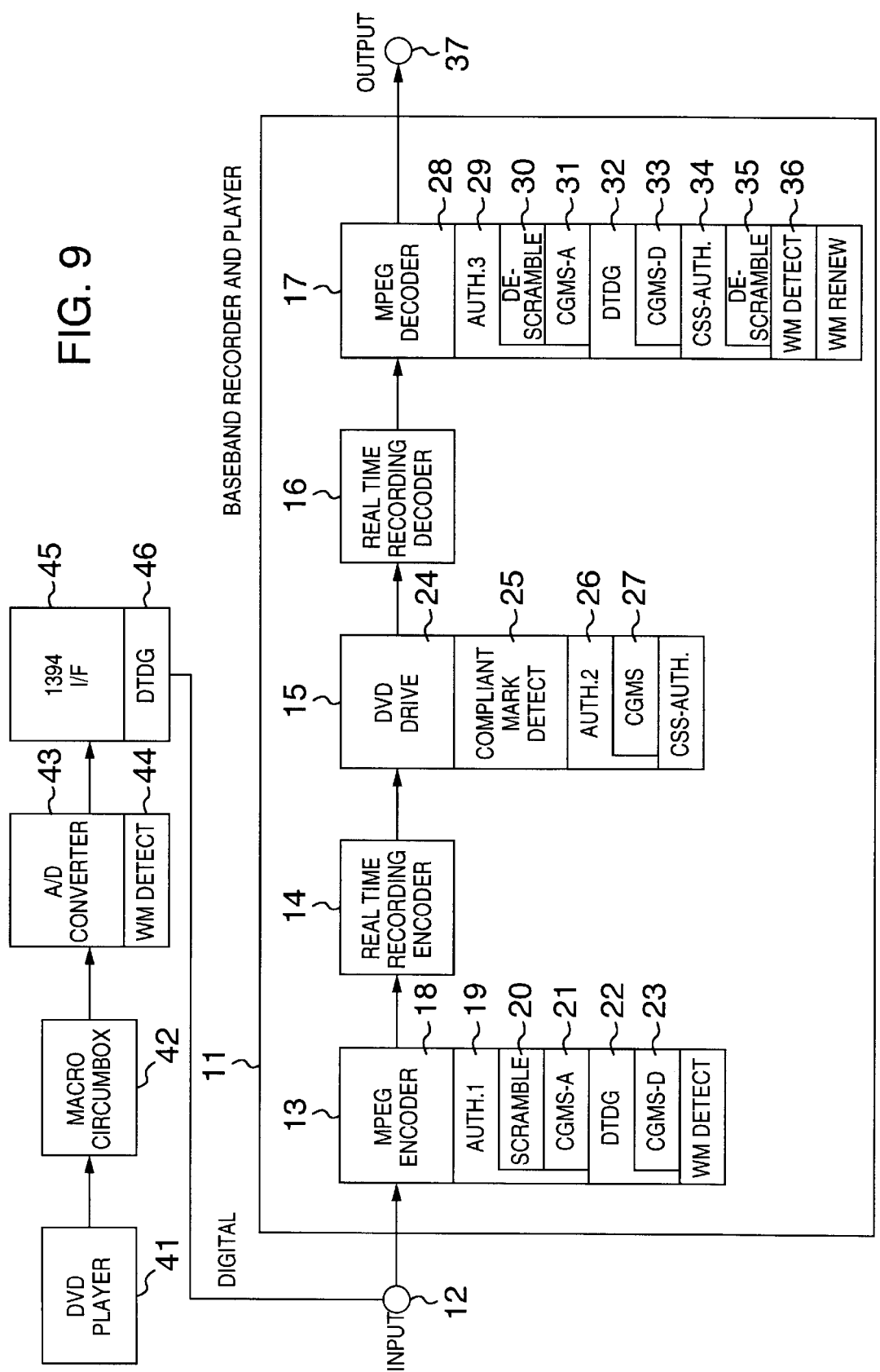
FIG. 9 is a diagram showing an embodiment of the invention in which an attempt is made for illegal duplication in the embodiment shown in FIG. 1.

FIG. 9 shows an example case of attempting the illegal duplication in the embodiment shown in FIG. 1. The same reference numerals as those in FIG. 1 designate the same processing and the same component elements as those in FIG. 1, respectively.

In FIG. 9, numeral 41 designates a DVD player, numeral 42 a macrovision removal unit for removing the macrovision false sync signal, numeral 43 an A/D converter for converting an analog signal into a digital signal, numeral 44 a watermark detection unit for the A/D converter, numeral 45 an IEEE1394 I/F conforming to the IEEE1394 format for digital transmission, and numeral 46 a DTDG unit for the IEEE1394 I/F.

In the case where the DVD player 41 reproduces the DVD disk not involved in illegal duplication, the macrovision false sync signal is multiplexed as an illegal duplication prevention signal for the analog input of the VTR. This signal may be removed by the macrovision removal unit 42 for removing the macrovision false sync signal. As long as the A/D converter 43 and the IEEE1394 I/F 45 are regular ones, the watermark detection unit 44 of the A/D converter can detect the watermark in the analog signal and if it is illegal, can suspend the output. In the case where the A/D converter 43 and the IEEE1394 I/F 45 are not regular ones, on the other hand, the analog signal is converted into a digital signal by the A/D converter 43 after removing the macrovision signal, and the converted signal is transmitted through the IEEE1394 I/F 45. In the absence of the DTDG unit for the IEEE1394 I/F, however, the authentication by the authentication unit 18 of the MPEG encoder fails and therefore the signal cannot be transmitted.

As described above, the illegal duplication and recording can be prevented and the correct reproduction control is made possible by providing the detection/renewing unit for the duplication control signal.

Figure 10:
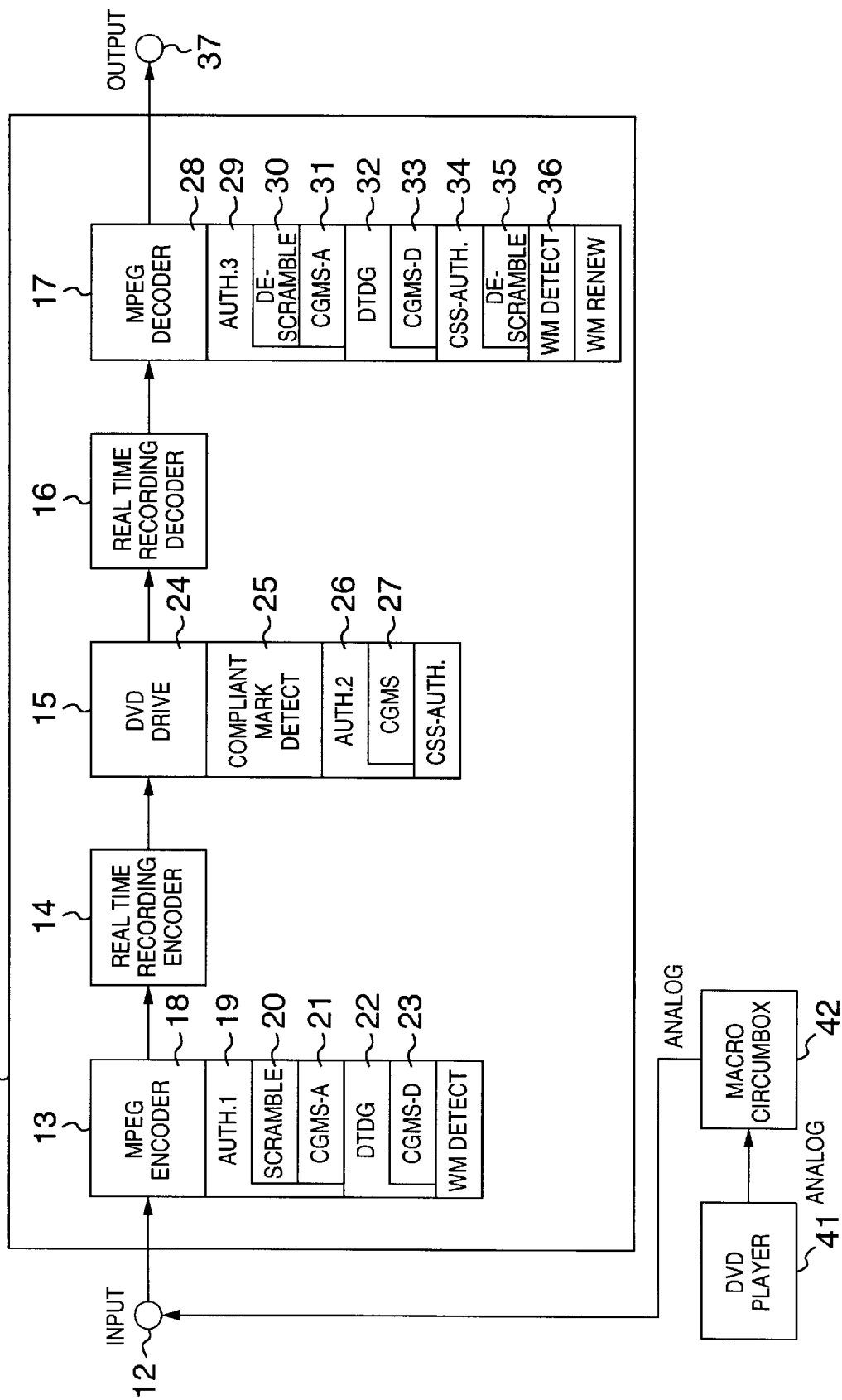
FIG. 10 is a diagram showing another embodiment of the invention in which an attempt is made for illegal duplication in the embodiment shown in FIG. 1.

FIG. 10 shows an example case in which the illegal duplication is attempted in the embodiment of FIG. 1. The same reference numerals as those in FIGS. 1 and 9 designate the same component elements, respectively.

In the case where the DVD player 41 reproduces the DVD mask not illegally duplicated, the macrovision false sync signal is multiplexed as an illegal duplication prevention signal for the analog input of the VTR. Nevertheless, this signal may be removed by the macrovision removal unit 42 for removing the macrovision sync signal. When this analog signal is connected to the signal input terminal 12, the signal is input to the baseband recording/reproduction apparatus 11. However, the watermark is detected by the watermark detection unit 23 included in the MPEG encoder 13, and the duplication is controlled accordingly. The provision in this way of the means for detecting/updating the duplication control signal in the baseband recording/reproduction apparatus permits the prevention of illegal duplication and recording and assuring the correct reproduction control.

Figure 11:
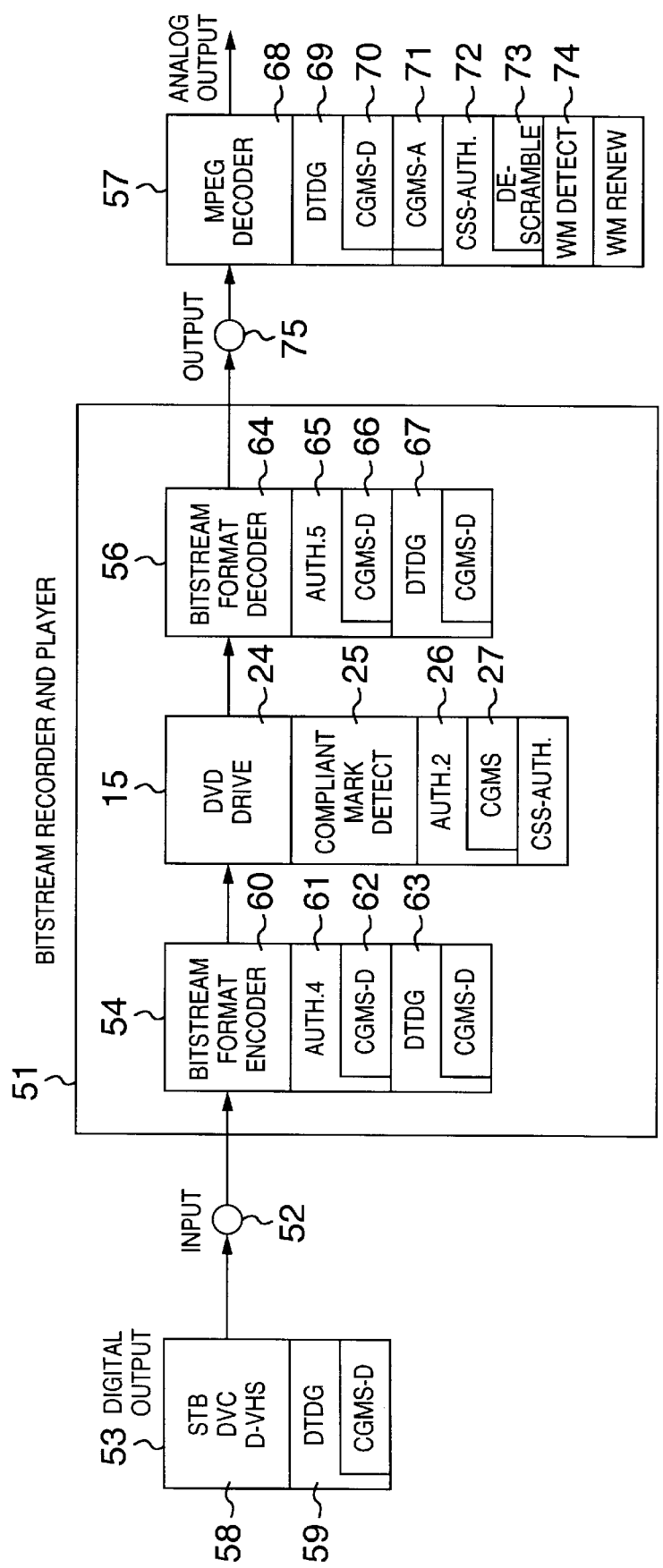
FIG. 11 is a diagram showing a recording/reproduction apparatus for recording/reproducing data-containing duplication control information according to another embodiment of the invention.

FIG. 11 shows a recording/reproduction apparatus for recording and reproducing data including the duplication control information according to an embodiment of the invention. This embodiment, unlike the baseband recording/reproduction apparatus shown in FIG. 1, represents a recording/reproduction apparatus for recording and reproducing with a bit stream the data series encoded by MPEG. This embodiment is shown as a device for the recording and reproducing operation such as a DVD-RAM drive, for example. Nevertheless, the embodiment is not of course limited to the recording/reproduction apparatus, but the recording apparatus, the reproduction apparatus, etc. are included as a part of this invention.

In FIG. 11, numeral 51 designates a bit stream recording/reproduction apparatus, numeral 52 a signal input, and numeral 53 a digital device such as a set top box, a digital video camera or a digital VHS which outputs a digital signal. Numeral 54 designates a bit stream encoder, numeral 15 a DVD-RAM drive, numeral 56 a bit stream decoder, numeral 57 a MPEG decoder, numeral 58 a DTDG means for a digital signal output unit, numeral 59 a CGMS-D for the DTDG, numeral 60 a bit stream encoder authentication means 4, numeral 61 a CGMS-D for the bit stream encoder authentication means 4, numeral 62 a DTDG means conforming to the IEEE1394 format for digital transmission, and numeral 63 a CGMS-D of IEEE1394 I/F.

Numeral 64 designates a bit stream decoder authentication means 5, numeral 65 a CGMS-D of the bit stream decoder authentication unit #4, numeral 66 a DTDG unit conforming to the IEEE1394 format for digital transmission, numeral 67 a CGMS-D for IEEE1394 I/F, numeral 68 a DTDG unit for the MPEG decoder, numeral 69 a CGMS-D for the DTDG, numeral 70 a CGMS-A for the authentication unit #3, numeral 71 a CSS authentication unit for the MPEG decoder, numeral 72 a CSS descramble unit, numeral 73 a watermark detection unit for the MPEG decoder, numeral 74 a watermark renewing unit for the MPEG decoder, and numeral 75 a signal output.

The operation of this system will be explained with reference to FIG. 11.

The digital signal output from a receiver such as a set top box for receiving the satellite broadcasting, a digital video camera or a digital VHS is input as a signal input 52 to the bit stream recording/reproduction apparatus 51. The bit stream recording/reproduction apparatus 51 is for compressing the data of image sequences, for example, according to the MPEG format, and thus reducing the data amount, recording and reproducing it in a recording medium such as a DVD-RAM disk in the form of a data bit series. For this purpose, the bit stream recording/reproduction apparatus 51 comprises the bit stream encoder 54, the DVD-RAM drive 15 and the bit stream decoder 56. Consider a personal computer having a similar function. Each component element can be replaced as a part or software such as an expansion board, and therefore can be regarded as an independent entity. In this case, a personal computer is assumed considering the situation in which the component elements are replaceable.

The digital signal output from a receiver such as a set top box for receiving the satellite broadcasting, a digital video camera or a digital VHS is output in the format of IEEE1394 I/F. These devices, therefore, have the DTDG unit 58. The DTDG unit 58 in turn includes a CGMS-D 59 for correctly processing the duplication generation management information. This digital output signal is input to the signal input 52 as an input to the bit stream recording/reproduction apparatus 51. The DTDG unit 58 of the digital signal output unit 53, in order to exchange data with the bit stream recording/reproduction apparatus using the IEEE1394 I/F, performs the transmission of a type employing the DTDG with the DTDG unit 62 of the bit stream encoder 54. The bit stream encoder 54 converts the signal transmitted by IEEE1394 into a format for writing in the DVD-RAM disk. The authentication unit #4 (60) of the bit stream recording/reproduction apparatus authenticates the bit stream encoder 54 and the DVD-RAM drive 15. Also, the authentication unit #4 (60) includes a CGMS-D (61) for updating the duplication generation management information with the input signal recorded.

The DVD-RAM drive 15 includes compliant mark detection unit 24, authentication unit #2 (25) and CSS authentication unit 27. The authentication unit #2 (25) authenticates the input/output device, which is a bit stream encoder at the time of recording and a bit stream decoder at the time of reproduction. The CGMS 26 records the duplication generation management information on the disk. At the time of recording, the compliant mark detection unit 24 records the compliant mark in order to indicate that the DVD-RAM drive is a compliant device. At the time of reproduction, on the other hand, the compliant mark is recorded in the case where the device having recorded the disk is a compliant device, and this compliant mark is detected. In the case where the detection of such a compliant mark is difficult, the reproduction operation is not performed.

With this configuration, the signal recorded in the DVD-RAM disk is generated and transmitted, so that the signal transmission to or receipt from the devices incapable of authentication is stopped, thereby making it possible to prevent illegal duplication.

The bit stream decoder 56 converts the signal written in the DVD-RAM disk into the IEEE1394 format. The bit stream decoder 56 includes an authentication unit #5 (64) and a DTDG unit 66. The authentication unit #5 (64) authenticates the bit stream decoder 56 and the MPEG decoder 57 for receiving the output signal, and in the case of authentication failure, suspends the output of the decoded data or rejects the acceptance of the input signal. The authentication unit #5 (64), on the other hand, includes a CGMS-D (65) for updating the duplication generation management information with the output signal added to the disk. Further, the DTDG unit 66 providing the duplication control in the digital transmission by IEEE1394 includes a CGMS-D (67) for updating the duplication generation management information from the CGMS recorded in the disk as a digital signal. The signal decoded in the bit stream decoder 56 is output to the signal output 75.

The MPEG decoder 57 includes a DTDG unit 68, a CSS authentication unit 71, a watermark detection unit 73 and a watermark renewing unit 74. The DTDG unit 68 constituting the duplication control for the digital transmission by IEEE1394 includes a CGMS-D (69) for updating the duplication generation management information from the CGMS recorded in the disk as a digital signal. Further, it includes a CGMS-A (70) for updating the duplication generation management information as an analog signal. In the case where the disk on the DVD-RAM drive is a recordable medium, the CSS authentication unit 71 authenticates it by CSS, and according to the result thereof, descrambles the scrambled data, if any, by the descramble unit 72. The watermark detection unit 73 detects the watermark embedded in the output baseband data at the time of reproduction. The output is stopped in the case where the watermark is prohibited from reproduction.

The watermark renewing unit 74 embeds the watermark in the data of the output baseband at the time of reproduction in accordance with the duplication generation information.

The signal recorded in the DVD-RAM disk is reproduced and transmitted with this configuration, so that the exchange of the signals with the devices incapable of being authenticated can be stopped thereby to prevent the illegal duplication. The personal computer includes the bit stream encoder 53, the DVD-RAM drive 15, the bit stream decoder 57, etc. configured with hardware or software, which can be independently replaceable. Unless the mating device with which to exchange the signals is a formal device having the authentication unit, however, the signals are not exchanged, and therefore the illegal duplication can be prevented. Also, the MPEG decoder 57 includes the watermark detection unit 73 and the watermark renewing unit 74, so that the need of other functions of watermark detection and updating in the other blocks is eliminated. As a result, the circuit size of the bit stream recording/reproduction apparatus can be reduced.

As described above, the use of a plurality of types of the duplication control signal detection and renewing unit in combination permits the prevention of illegal duplication and the correct recording/reproduction control.

Figure 12:
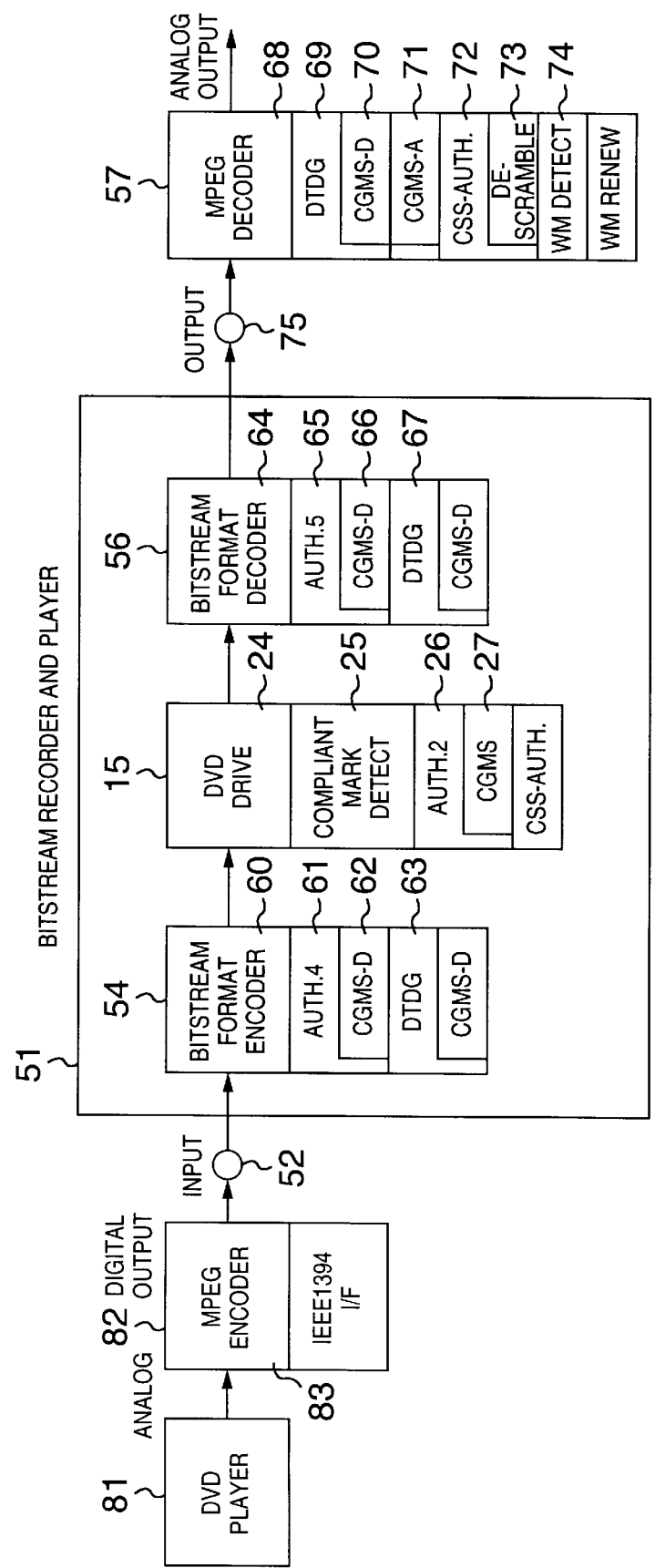
FIG. 12 is a diagram showing an embodiment of the invention in which an attempt is made for illegal duplication in the embodiment shown in FIG. 11.

FIG. 12 shows an example case in which illegal duplication is attempted in the embodiment shown in FIG. 11. The component parts having the same reference numerals as those in FIG. 4 are designated by the same reference numerals, respectively.

In FIG. 12, numeral 81 designates a DVD player, numeral 82 a MPEG encoder, and numeral 83 an IEEE1394 I/F conforming to the IEEE1394 format for digital transmission.

Assume that the DVD play 81 reproduces a DVD disk not involved in the illegal duplication and is incapable of further duplication. In the case where the MPEG encoder 82 is not formally authenticated for video recording, the duplication generation management information from the DVD player 81 may be ignored. The output of the DVD player 81 is encoded by the MPEG encoder 82, and when the output of the MPEG encoder 82 is input to the bit stream recording/reproduction apparatus 51, the data are transmitted through the IEEE1394. In the method employing DTDG, the operation of protecting the copyright, if required, is performed for the data requiring the protection. The duplication-free data, for example, can be digitally transmitted, and therefore a given data may be transmitted under the disguise of duplication-free data. In the case under consideration, the duplication-free data are also authenticated between mutual IEEE1394s, and unless authenticated, the data input/output is suspended. As a result, the MPEG encoder 82, if not formal, can be protected from illegal duplication.

Figure 13:
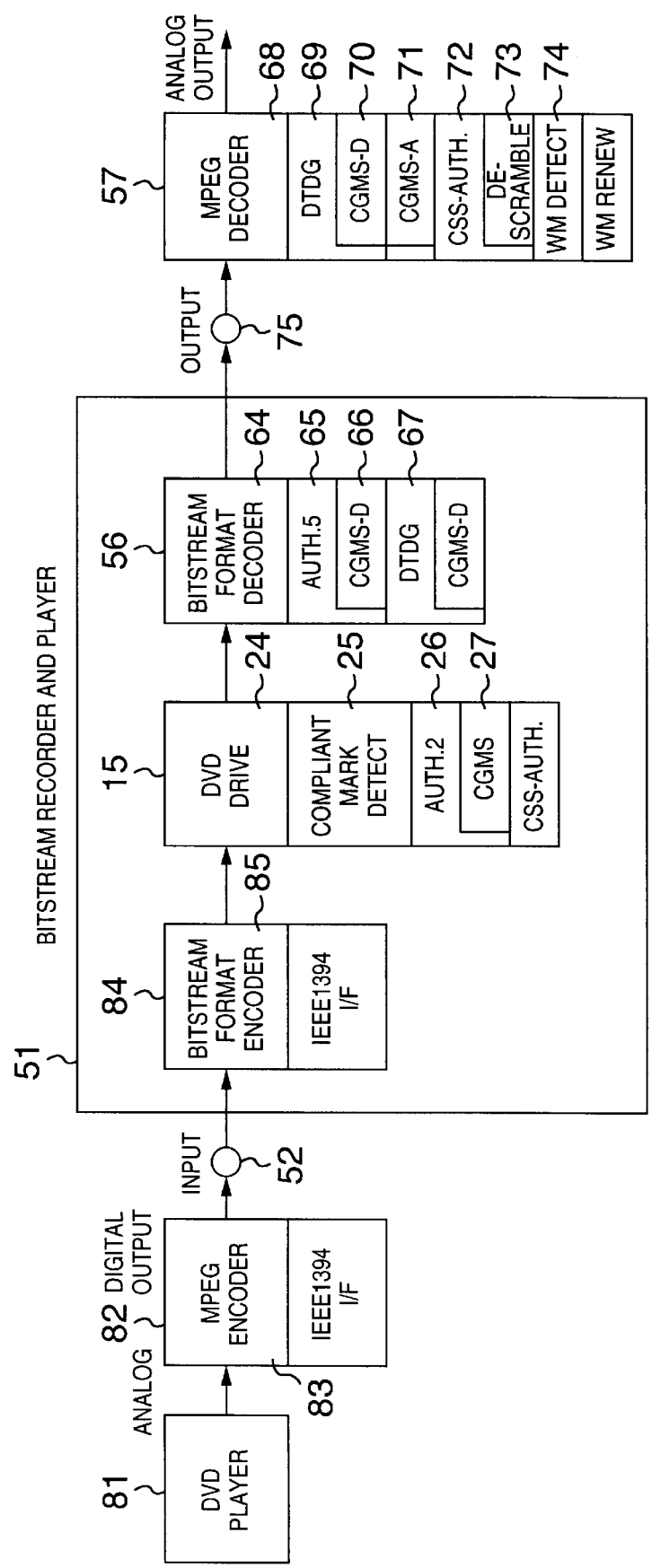
FIG. 13 is a diagram showing an embodiment of the invention in which an attempt is made for illegal duplication in the embodiment shown in FIG. 11.

FIG. 13 shows another example of the case in which illegal duplication is attempted in the embodiment shown in FIG. 11. The component parts designated by the same reference numerals as the corresponding parts in FIGS. 4 and 5 are designated by the same reference numerals, respectively.

In FIG. 13, numeral 84 designates a bit stream format encoder. This bit stream format encoder is not formally authenticated for video signal recording, but includes an IEEE1394 I/F (85) conforming with the IEEE1394 format for data transmission.

Assume that the DVD player 81 reproduces the DVD disk not involved in the illegally duplication and no further duplication is impossible. Unless the MPEG encoder 82 is formally authenticated for video recording, the duplication generation management information from the DVD player 81 may be ignored. When the output of the DVD player 81 is encoded by the MPEG encoder 82 and the output thereof is input to the bit stream recording/reproduction apparatus 51, the data are transmitted through IEEE1394. In the method employed by the DTDG, the operation for copyright protection is performed for the data requiring copyright protection. In the case of duplication-free data, however, digital transmission is possible, and therefore a given data may be transmitted under the disguise of a duplication-free data. The bit stream encoder 84, which is not formally authenticated for video signal recording and has the IEEE1394 I/F (85) conforming with the IEEE1394 format, can receive the data which is applied to the bit stream recording/reproduction apparatus 51. In an attempt to record this signal in the DVD-RAM drive 15, the authentication fails between the DVD-RAM drive 15 and the bit stream encoder 84. Therefore, the DVD-RAM drive 15 suspends the recording in the DVD-RAM disk. As a result, the production of an illegal duplication disk can be prevented even in the case where the bit stream encoder is not a formal one.

Figure 14:
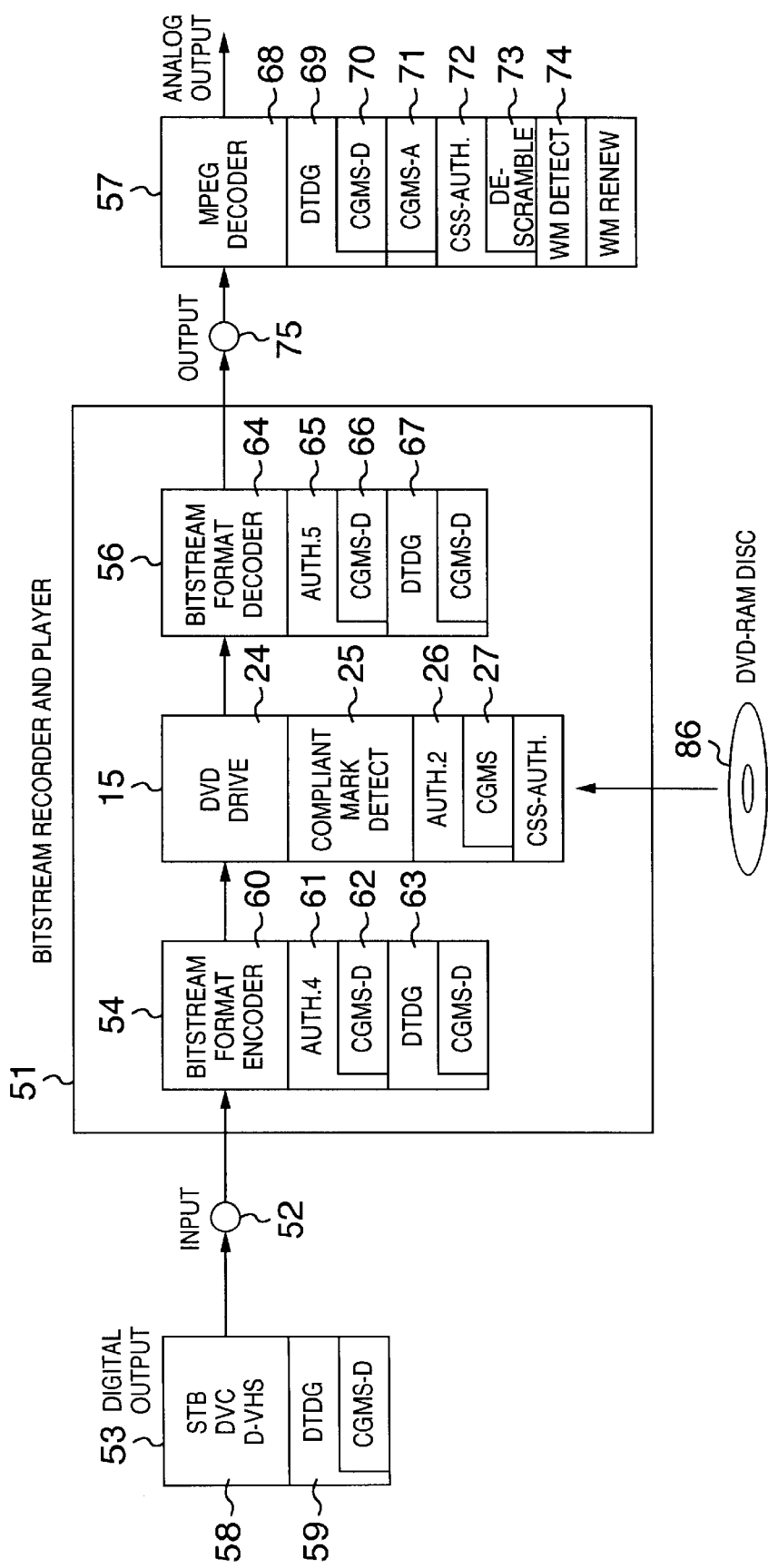
FIG. 14 is a diagram showing an embodiment of the invention in which an attempt is made for illegal duplication in the embodiment shown in FIG. 11.

FIG. 14 shows an example of the attempt of illegal duplication in the embodiment of FIG. 11. The component parts designated by the same reference numerals as in FIG. 4 are coincident with the corresponding component parts in FIG. 4, respectively.

In FIG. 14, numeral 86 designates a DVD-RAM disk. Suppose the DVD-RAM disk is illegally duplicated by the drive not formally authenticated. A compliant mark indicating the formality of the disk is not attached. As a result, the compliant mark detection unit 24 detects the absence of the compliant mark on the DVD-RAM drive 15, and stops the disk reproduction operation.

Even in the case where the DVD-RAM disk 86 is recorded as duplication-free data by a formal drive but as long as the watermark is embedded in the particular data, the watermark is detected by the watermark detection unit 73 attached to the MPEG decoder 57. If an illegal duplication is determined, therefore, the reproduction output is stopped. These methods can prevent the reproduction of the DVD-RAM disk 86, even if recorded by illegal duplication.

Figure 15:
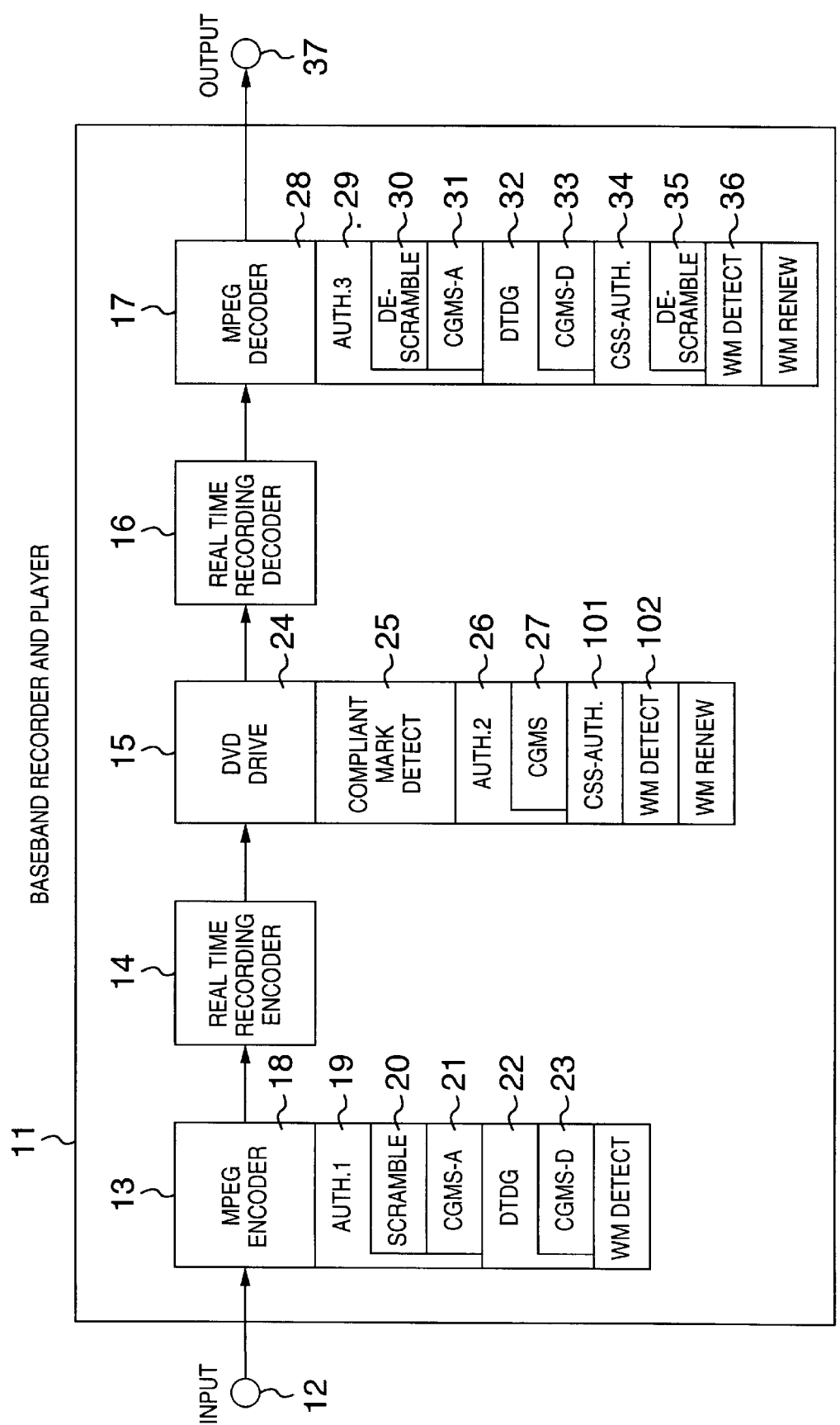
FIG. 15 is a diagram showing a recording/reproduction apparatus for recording/reproducing data containing the duplication control information according to another embodiment of the invention.

FIG. 15 shows a recording/reproduction apparatus for recording and reproducing the data including the duplication control information according to another embodiment of the invention. The processes designated by the same reference numerals as in FIG. 1 constitute the corresponding processes, respectively. This embodiment, which represents a device for recording and reproduction such as the DVD-RAM drive, is of course not limited to the recording/reproduction apparatus, but applicable to a recording apparatus and a reproduction apparatus incorporated as a part of the embodiment. Numeral 101 designates the watermark detection unit and numeral 102 the watermark renewing unit.

The operation of this system will be explained with reference to FIG. 15. This embodiment represents a device for recording and reproducing in and from a medium capable of recording and reproduction such as the DVD-RAM. The embodiment, however, is not of course limited to the optical disk but applicable to the recording/reproduction apparatuses in general for recording and reproducing the data.

The signal to be recorded such as the one received by the receiver including a set top box for receiving the satellite broadcasting is input as a signal 12 to the baseband recording/reproduction apparatus 11. The baseband recording/reproduction apparatus 11 compresses the image sequence data by the MPEG format, for example, and records it in or reproduces it from a recording medium such as the DVD-RAM disk. In view of this, the baseband recording/reproduction apparatus 11 roughly comprises the MPEG encoder 13, the real-time encoder 14, the DVD-RAM drive 15, the real-time decoder 16 and the MPEG decoder 17. Consider a personal computer having a similar function. Each component element is replaceable as a part or software such as an expansion board, and therefore can be regarded as an independent entity. Considering the case where parts are replaceable, the following explanation assumes the case of a personal computer. The same operation as that in FIG. 1 will not be explained.

The DVD-RAM drive 15 includes a compliant mark detection unit 24, an authentication unit #2 (25), a CSS authentication unit 27, a watermark detection unit 101 and a watermark renewing unit 102. The authentication unit #2 (25) authenticates an input/output device, which is a MPEG encoder for recording and a MPEG decoder for reproduction. The CGMS 26 records the duplication generation management information on a disk. At the time of recording, the compliant mark detection unit 24 records a compliant mark indicating that the DVD-RAM drive is a compliant device. In the case where a device having the disk recorded therein is a compliant device at the time of reproduction, on the other hand, a compliant mark is recorded. Therefore, the compliant mark is detected. When the compliance mark cannot be detected, the reproduction operation is withheld. At the time of recording, the watermark detection unit 101 detects the watermark embedded in the signal recorded in the disk, and at the time of reproduction, detects the watermark embedded in the signal reproduced from the disk. At the time of recording, the watermark renewing unit 102 detects the watermark embedded in the signal recorded in the disk, and when the result shows that the renewal of the watermark is required, renews and records it. At the time of reproduction, on the other hand, the watermark embedded in the signal recorded in the disk is detected, and in the case where the result shows the need of renewing the watermark, renews and outputs it.

With this configuration, the signal recorded in the DVD-RAM disk is generated and transmitted, so that the signal exchange with the devices incapable of being authenticated is stopped, thereby making it possible to prevent illegal duplication. Also, the DVD-RAM drive 15 includes the watermark detection unit 101 and the watermark renewing unit 102, whereby it is possible to detect and renew the watermark in the signal recorded in the disk. It becomes thus more difficult to avoid detection and renewal than with the MPEG encoder 13 and the MPEG decoder 17. The foregoing description assumes that the component elements can be replaced like the PC in this embodiment. In the event that the replacement is impossible such as for the home-use DVD recording/reproduction apparatus, only one authentication unit is provided, and a plurality of them is not required for the input/output of the apparatus.

The provision of the detection/renewing unit for a plurality of types of duplication control signal as described above prevents the illegal duplication and the assures correct recording/reproduction control. In FIG. 15, the recording and the reproduction unit are separately provided, and so are the compression unit and the expansion unit. Nevertheless, these functions may be integrated into a single device, respectively, like a recording/reproduction unit and a compression/expansion unit.

FIG. 16 shows a recording/reproduction apparatus for recording and reproducing the data including the duplication control information according to another embodiment of the invention. The component parts designated by the same reference numerals in FIG. 16 as in FIG. 11 are designated by the same reference numerals, respectively. This embodiment represents a recording/reproduction apparatus like a DVD-RAM drive. The embodiment, however, is not of course limited to the recording/reproduction apparatus but a recording apparatus or a reproduction apparatus can be incorporated as a part of the embodiment. Numeral 111 designates a watermark detection unit and numeral 112 a watermark renewing unit.

The operation of this system will be explained with reference to FIG. 16. This embodiment represents an apparatus for recording and reproducing signals in a recording medium like the DVD-RAM capable of recording and reproduction. However, the recording medium is of course not limited to the optical disk, but is applicable to the data recording/reproduction apparatuses in general.

The digital signal output from the receiver such as a set top box for receiving the satellite broadcasting and the digital video camera, the digital VHS, etc. is input as a signal input 52 to a bit stream recording/reproduction apparatus 51. The bit stream recording/reproduction apparatus 51 is so operated that the image sequence data are compressed in the MPEG format with a reduced data amount and recorded and reproduced in and from a recording medium such as the DVD-RAM disk in the form of data bit series. For this purpose, the bit stream recording/reproduction apparatus 51 is configured with a bit stream encoder 54, a DVD-RAM drive 15 and a bit stream decoder 56. Consider a personal computer having a similar function. Each component element can be replaced as a part or software like an expansion board, and therefore can be regarded as an independent component element. Considering the situation in which devices are replaceable, assume a personal computer.

The digital signal output from the receiver such as a set top box for receiving the satellite broadcasting or the digital video camera, the digital VHS, etc. is output in the format of IEEE1394 I/F. As a result, these devices include a DTDG unit 58. The DTDG unit 58 in turn includes a CGMS-D59 for processing the duplication generation management information correctly as a digital signal. This digital output signal is input to the signal input 52, and then input to the bit stream recording/reproduction apparatus 51. The DTDG unit 58 of the digital signal output unit 53, in order to exchange data with the bit stream recording/reproduction apparatus using the IEEE1394 I/F, transmits data with the DTDG unit 62 of the bit stream encoder 54 according to the method employed by DTDG. The bit stream encoder 54 converts the signal transmitted by IEEE1394 into a format for writing in the DVD-RAM disk. The authentication unit #4 (60) for the bit stream recording/reproduction apparatus authenticates the bit stream encoder 54 and the DVD-RAM drive 15. Also, the authentication unit #4 (60) includes a DGMS-D (61) for renewing the duplication generation management information by recording the input signal. The same operation as in FIG. 11 will not be explained.

The DVD-RAM drive 15 includes a compliant mark detection unit 24, an authentication unit #2 (25), a CSS authentication unit 27, a watermark detection unit 111 and a watermark renewing unit 112. The authentication unit #2 (25) authenticates an input/output device, which is a MPEG encoder at the time of recording and a MPEG decoder at the time of reproduction. The CGMS 26 records the duplication generation management information on the disk. The compliant mark detection unit 24 records a compliant mark in order to indicate that the DVD-RAM drive involved is a compliant device. In the case where the device that has recorded the disk is a compliant one at the time of reproduction, the compliant mark recorded is detected, or in the case where it cannot be detected, the reproduction operation is not performed. The watermark detection unit 111 detects the watermark embedded in the signal recorded in the disk at the time of recording, and detects the watermark embedded in the signal reproduced from the disk at the time of reproduction. The watermark renewing unit 112, on the other hand, detects the watermark embedded in the signal recorded in the disk and, as required according to the result thereof, renews and records the watermark. At the time of reproduction, on the other hand, the watermark embedded in the signal recorded in the disk is detected, and as required from the result thereof, renews and outputs the watermark.

The signal recorded in the DVD-RAM disk is generated and transmitted with this configuration, so that the signal exchange with the devices incapable of being authenticated is stopped thereby to prevent the illegal duplication. Also, the provision of the watermark detection unit 111 and the watermark renew unit 112 in the DVD-RAM drive 15 makes it possible to detect and renew the watermark contained in the signal recorded in the disk. Thus, it becomes more difficult to avoid the detection and renewal than with the MPEG encoder 53 or the MPEG decoder 57. This embodiment was explained on the assumption that each component element is replaceable such as in a personal computer. In the case where a component element cannot be replaced as in a home-use DVD recording/reproduction apparatus, only one authentication unit, not a plurality of them, is required for the input/output of the apparatus.

It will thus be understood from the foregoing description that the provision of a plurality of types of duplication control signal detection/renew unit permits the prevention of illegal duplication and makes correct recording/reproduction control possible. The embodiment in FIG. 16 includes a recording unit separately from a reproduction unit, and a compression unit separately from an expansion unit. Nevertheless, these functions may be integrated into a recording/reproduction unit and a compression/expansion unit, respectively.

What is claimed is:

1. A data recording apparatus comprising:
   compression means for compressing an image signal into compressed data;
   first conversion means for converting the compressed data into converted data of a predetermined format for recording in a recording medium;
   recording means for recording the converted data in the recording medium; and
   first detection means for detecting predetermined security information embedded in image information data of the image signal;
   wherein the compression means and the recording means each include authentication means for determining whether data exchange between the compression means and the recording means is permitted or not; and
   wherein mutual compressed data and data accompanying the mutual compressed data are exchanged after ascertaining establishment of mutual authentication.

2. A data recording apparatus according to claim 1 wherein in a case where the predetermined security information detected by the first detection means is indicative of information allowed to be recorded, the mutual compressed data and the data accompanying the mutual compressed data are exchanged even in a case where the mutual authentication is not established.

3. A recording apparatus comprising:
   compression/expansion means for compressing an image signal into a compressed image signal or expanding a compressed image signal into an image signal;
   detection means for detecting watermark information from the image signal; and
   shifting means for shifting the image signal or the compressed image signal by a predetermined number of lines of image signal, wherein a position of the image signal or the compressed image signal is displaced by the shifting means within a range where the watermark information is detected by the detecting means.

4. A data recording/reproducing apparatus comprising:
   compression means for compressing an image signal into compressed data;
   first conversion means for converting the compressed data into converted data of a format for recording in a recording medium;
   recording means for recording the converted data in the recording medium;
   reproducing means for reproducing data from the recording medium;
   second conversion means for demodulating an image signal from a format in which reproduced data is recorded in the recording medium, and converting a demodulated mage signal into a compressed format;
   expansion means for expanding compressed data converted in said second conversion means in accordance with the format of compression;
   authentication means provided in each of said compression means and said recording means for determining whether data exchange between said compression means and said recording means is permitted or not, mutual compressed data and the data accompanying said mutual compressed data being exchanged after ascertaining the establishment of mutual authentication;
   first detection means for detecting added information embedded in image information data of the image signal, wherein a compressed data output being controllable in accordance with a detection result of the added information detected by said first detection means;
   second detection means for detecting the added information embedded in the image signal produced as the result of expansion, the output of the image signal during the expansion processing or after the expansion processing of said expansion means being controllable in accordance with a detection result of the added information detected by said second detection means; and each of said recording means and said reproducing means including third detection means for detecting whether the recording means which recorded data in the recording medium complied with a rule or not, wherein the reproduction is suspended or the output thereof is suspended in a case where it is detected that the recording means does not comply with the rule.

5. A data recording/reproducing apparatus according to claim 4, wherein in a case where the added information detected by said first detection means is duplication limiting information and a result of detection thereof is a prohibition of recording, a selected one of said compression processing of said compression means and an output of said compressed data is suspended, in a case where the added information detected by said second detection means is duplication limiting information and the recording of a particular information is prohibited, an output of the image signal during expansion processing or after the expansion processing by said expansion means is suspended, and said expansion means includes means for rewriting said added information.

* * * * *